Oct. 14, 1924.
L. J. McHENRY
TIRE CHAIN
Filed Feb. 4, 1924
1,511,740
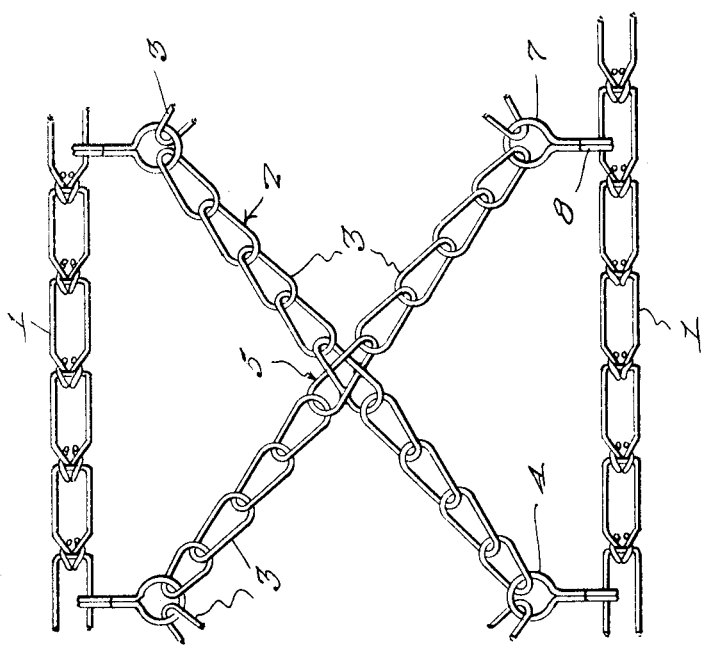
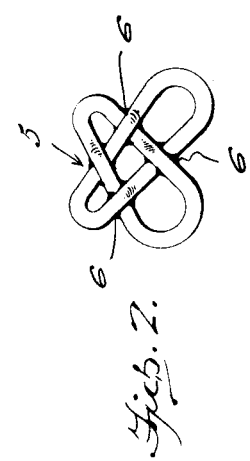
Inventor
L. J. McHenry
By Clarence A. O'Brien
Attorney

UNITED STATES PATENT OFFICE.

LUTHER J. McHENRY, OF BLOOMSBURG, PENNSYLVANIA.

TIRE CHAIN.

Application filed February 4, 1924. Serial No. 690,639.

*To all whom it may concern:*

Be it known that I, LUTHER J. MCHENRY, a citizen of the United States, residing at Bloomsburg, in the county of Columbia, and State of Pennsylvania, have invented certain new and useful Improvements in Tire Chains, of which the following is a specification.

This invention relates to new improvements in automobile tire chains.

An object of the invention is to provide a tire chain structure having side chains adapted to extend circumferentially around the wheel at opposite sides thereof and connected by a plurality of pairs of tread chains arranged in crossed relation and having interwoven connecting means in the form of central links for interlocking the chains to prevent side slipping.

This invention includes other objects and details of construction of the chain members and the links which are more particularly pointed out in the following description and claims.

In the drawing, forming a part of this application:

Figure 1 is a plan view of a portion of a tire chain, showing the side members, the cross chain and the interwoven connecting links.

Figure 2 is an enlarged plan view of the connection link.

Figure 3 is a side elevational view of the link connecting the cross chain with the side chain.

1 indicates a pair of side chains adapted for positioning at opposite sides of a tire in the usual manner to extend in concentric relation with said tire at each side thereof for holding the tread chains 2 in proper relation on the tread of the tire. The tread chains comprise a plurality of cross chains 3 secured at their opposite ends to hook links 4 having the hook portions thereof secured through the links of the side chains. The chains 3 cross or intersect each other at the central portion which is also at the central portion of the tread of a tire to which the chains are applied and the connecting means or crossing links 5 are interwoven as indicated, the side portions of the links being welded together as indicated at 6 at all of the points of crossing so that a relative lateral movement of one chain with respect to the other is prevented while the chains are in use on the tire. The hook links 4 are formed of a single piece of wire formed into a loop 7 intermediate the ends, from which the end portions 8 extend in close contact with one another and are formed into a loop 9 arranged laterally of the loop 7. From this structure, it will be noted that the end links of the cross chain 3 may be slipped between the two ends 8 of the hook link and into the loop 7 thereof to be retained in said loop without additional securing means. The looped end 9 has the end portions thereof inserted through the links of the side chains 1 as clearly shown in Figure 1 of the drawing, after which the terminal ends are bent into close proximity with the portions 8 for securing the cross chains to the side chains, and which may be moved when it is desired to renew and replace worn chains.

In use, it will be apparent that the interwoven links 5 at the central portion of each cross chain will prevent lateral movement of one of the chains on the other and provide for a holding action on the chain in both a lateral direction and either forwardly or rearwardly, so that skidding is not only prevented, but a positive and effective grip is provided and maintained through this interwoven link structure.

By interweaving the sides of the links as clearly shown in Figure 2, it will be noted that the cross link which is subjected to the greatest amount of wear by reason of its being in the center of the tread, breakage of the sections is prevented until the section is entirely worn out, by reason of the sides of one link being interwoven with the other link, so that one side will first extend below the other link and then above the opposite side of the other link, and the other side of the link will first extend above and then below the other link in a reverse manner. The crossing sections are welded together as above described, and a cross link of maximum strength and wearing qualities is thus provided.

What is claimed is:

1. In a tire chain structure, a plurality of pairs of tread chains, said tread chains intersecting each other at their centers whereby to dispose them diagonally with respect to the tread of the tire, said tread being interwoven and secured together in angular relation.

2. In a tire chain, connecting means for the intersecting portions of a pair of diagonally disposed tread chains, said connect- links intersecting each other at their centers with the arms of each interwoven with the other and permanently secured together.

In testimony whereof I affix my signature.

LUTHER J. McHENRY.